US012056505B2

(12) United States Patent
Ansari et al.

(10) Patent No.: US 12,056,505 B2
(45) Date of Patent: Aug. 6, 2024

(54) DISTRIBUTED CONFIGURATION OF PROGRAMMABLE DEVICES

(71) Applicant: XILINX, INC., San Jose, CA (US)

(72) Inventors: Ahmad R. Ansari, San Jose, CA (US); David P. Schultz, Seattle, WA (US)

(73) Assignee: XILINX, INC., San Jose, CA (US)

( * ) Notice: Subject to any disclaimer, the term of this patent is extended or adjusted under 35 U.S.C. 154(b) by 19 days.

(21) Appl. No.: 17/862,257

(22) Filed: Jul. 11, 2022

(65) Prior Publication Data

US 2024/0012655 A1 Jan. 11, 2024

(51) Int. Cl.
G06F 15/177 (2006.01)
G06F 9/00 (2018.01)
G06F 9/24 (2006.01)
G06F 9/445 (2018.01)

(52) U.S. Cl.
CPC ................................ G06F 9/44505 (2013.01)

(58) Field of Classification Search
CPC .................................................. G06F 9/44505
See application file for complete search history.

(56) References Cited

U.S. PATENT DOCUMENTS

| 9,641,873 | B1 * | 5/2017 | Nguyen | H04N 21/4345 |
| 10,396,848 | B1 * | 8/2019 | Kondareddy | H04W 72/0446 |
| 11,088,902 | B1 * | 8/2021 | Palavalli | H04L 41/0895 |
| 11,436,097 | B1 * | 9/2022 | Kumar | G06F 11/008 |
| 2011/0200045 | A1 * | 8/2011 | Baehre | H04L 12/4633 370/392 |
| 2020/0076684 | A1 * | 3/2020 | Naveen | H04L 12/66 |
| 2020/0186780 | A1 * | 6/2020 | Tsukagoshi | H04N 21/434 |
| 2020/0252682 | A1 * | 8/2020 | Walker | H04N 21/251 |
| 2020/0336213 | A1 * | 10/2020 | Hassan | H04B 10/60 |
| 2021/0119897 | A1 * | 4/2021 | Chen | H04L 47/822 |
| 2021/0314219 | A1 * | 10/2021 | Gujar | H04L 41/08 |
| 2022/0300503 | A1 * | 9/2022 | Neugebauer | G06F 16/245 |
| 2023/0344710 | A1 * | 10/2023 | Gardner | H04L 41/082 |

OTHER PUBLICATIONS

Lu, T., et al. "Statix 10 Secure Device Manager Provides Best-in-Class FPGA and SoC Security," Altera Corporation, Jun. 2015, 11 pages.

International Search Report and Written Opinion for PCT/US2023/017320 dated Jul. 24, 2023.

(Continued)

*Primary Examiner* — Xuxing Chen
(74) *Attorney, Agent, or Firm* — Patterson + Sheridan, LLP

(57) ABSTRACT

Embodiments herein describe a distributed configuration system for a configurable device. Instead of relying solely on a central configuration manager to distribute configuration information to various subsystems in the device, the embodiments herein include configuration interface managers (CIM) that are distributed in different regions of the device, whether those regions are in one integrated circuit or include multiple integrated circuits. The embodiments can still use a central configuration manager to distribute configuration information in a device image to the plurality of CIMs, which can then forward the configuration information to their assigned regions.

20 Claims, 7 Drawing Sheets

(56) References Cited

OTHER PUBLICATIONS

Wanta, Damien, et al., "A Run-Time Reconfiguration Method for an FPGA-Based Electrical Capacitance Tomography System", Electronics, vol. 11, No. 4, Febraury 11, 2022.

Shelburne, M, et al., "Metawire: Using FPGA configuration circuitry to emulate a Network-on-Chip", Field Programmable Logic and Applications, 2009. International Conference on, IEEE, Piscataway, NJ, USA, Sep. 8, 2008.

Thanh, Tran, et al., "A protocol for secure remote update of run-time partially reconfigurable systems based on FPGA", 2013 International Conference on Control, Automation and Information Sciences (ICCAIS), IEEE, Nov. 25, 2013.

\* cited by examiner

US 12,056,505 B2

DISTRIBUTED CONFIGURATION OF PROGRAMMABLE DEVICES

TECHNICAL FIELD

Examples of the present disclosure generally relate to a distributed system for configuring a device containing one or more integrated circuits.

BACKGROUND

Traditionally, configurable devices are configured through a central configuration manager. As a result, the configuration manager is typically the bottleneck when configuring the device. This was tolerated when devices (e.g., integrated circuits) were small and did not include different subsystems. However, recent configurable devices can include systems on chips (SoCs) that include heterogeneous computing system that can include a network-on-chip (NoC), memory controllers, data processing engines, processor subsystems, programmable logic, and other subsystems that require their own programming information. Additionally, these subsystems may directly interface with the programmable logic which has become orders of magnitude larger, especially with the advent of stacked die devices. Any configuration (or partial reconfiguration) of these devices requires a mix of various configuration partitions that are transferred through distinct interfaces. The size and non-homogeneous nature of the programming images for these devices has made the configuration through a central configuration manager even more inefficient.

SUMMARY

One embodiment describes a configurable device that includes a central configuration manager circuit and a plurality of configuration interface manager (CIM) circuits connected to the central configuration manager circuit and distributed throughout the configurable device. The central configuration manager circuit is configured to receive a device image for configuring the configurable device, parse the device image to identify configuration packets for the plurality of CIM circuits, and transmit the configuration packets to the plurality of CIM circuits. Further, the plurality of UM circuits is configured to forward the configuration packets to assigned regions of the configurable device. Thus hardware accelerator is configured to . . . .

Another embodiment described herein is a method that includes receiving, at a central configuration manager circuit, a device image for configuring a configurable device, parsing the device image to identify configuration packets for a plurality of CIM circuits in the configurable device, transmitting the configuration packets from the central configuration manager circuit to the plurality of CIM circuits, and forwarding, by the plurality of CIM circuits, the configuration packets to assigned regions of the configurable device.

Another embodiment described herein is a configurable device that includes a central configuration manager circuit, a network, and a plurality of configuration interface manager (CIM) circuits connected to the central configuration manager circuit via the network. The central configuration manager circuit is configured to receive a device image for configuring the configurable device, identify portions of the device image intended for each of the plurality of CIM circuits, transmit the portions of the device image to the plurality of CIM circuits. Moreover, the plurality of CIM circuits is configured to forward the portions of the device image to assigned regions of the configurable device.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
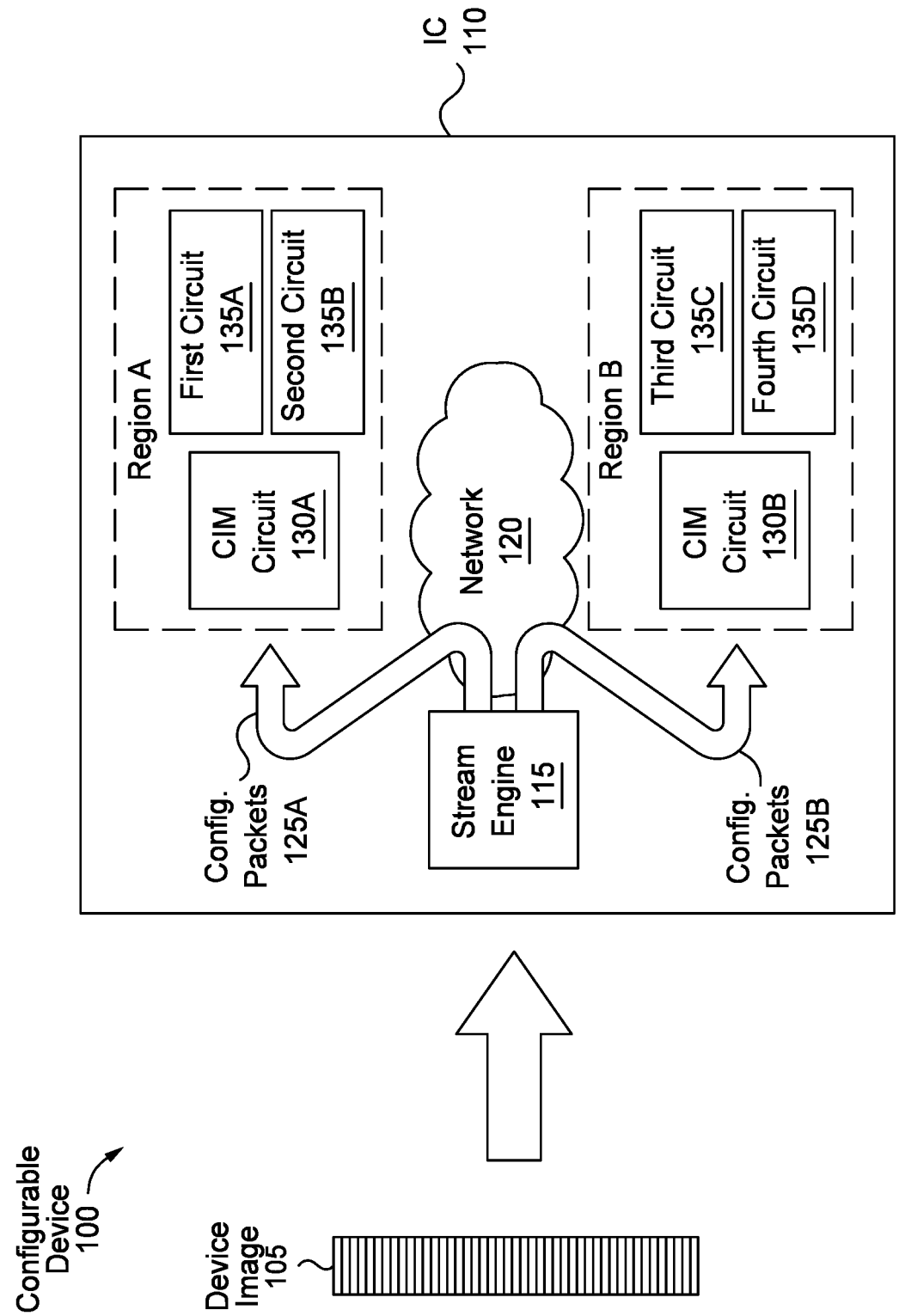
FIG. 1 illustrates configuring an integrated circuit using a distributed system, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a distributed configuration system for a configurable device. Instead of relying solely on a central configuration manager circuit to distribute configuration information to various subsystems in the device, the embodiments herein include configuration interface managers (CIM) (also referred to as CIM circuits) that are distributed in different regions of the device, whether those regions are in one integrated circuit or span across multiple integrated circuits. The embodiments can still use a central configuration manager to enforce the security on the system and to provide a unified application programming interface (API) for the user to interface with. Further, the central configuration manager can provide the underlying infrastructure to parallelize the configuration information contained in a device image and distribute the responsibility of parsing and programming the regions to the CIMs.

In one embodiment, each region in the configurable device has its own dedicated configuration interfaces that are accessed by its dedicated CIM. Further, the CIMs can operate in parallel. This distributed architecture provides orders of magnitude improvement in the time required for the configuration and bringing up of the device without passing any additional complexity to the users in designing their systems.

FIG. 1 illustrates configuring a configurable device 100 using a distributed system, according to an embodiment. In this example, the configurable device 100 includes a single integrated circuit (IC) 110. In one embodiment, the IC 110 includes a heterogeneous computing system that includes different types of subsystems (e.g., NoCs, data processing engines, memory controllers, programmable logic, etc.) that are configured using configuration information in a device image 105. For example, the IC 110 can be a SoC or an application specific integrated circuit (ASIC).

In another embodiment, the IC 110 includes a homogeneous computing system. While the distributed configuration system described herein can offer the most improvement to a device that has a heterogeneous computing system (due to having a mix of various configuration partitions that are transferred through distinct interfaces), the embodiments herein can also improve the process of configuring homogenous computing systems, especially when those systems become larger. For example, the IC 110 may be a large field programmable array (FPGA) that includes programmable logic that is configured by the device image 105.

Notably, a configurable device is not limited to having programmable logic. That is, the embodiments here can be applied to a configurable device that does or does not include programmable logic. The distributed configuration system described herein can be used in any configurable device that relies on a received device image 105 to configure at least one subsystem in the device before the device begins to perform a user function.

The IC 110 includes a stream engine 115 (e.g., circuitry) that receives the device image 105 for configuring the device 100. The stream engine 115 is one example of a central configuration manager circuitry and in other embodiments the stream function can be implemented using back-to-back memory mapped transfers at the physical interface level. Thus, the stream engine 115 can be a memory-mapped engine that receives the device image through memory-mapped data write.

As shown, the stream engine 115 receives the device image 105 composed of packetized configuration data and then forwards respective configuration (config) packets 125 to different regions in the IC 110. The stream engine 115 can serve as the user interface with APIs to communicate with an external host computing system (not shown). The stream engine 115 is discussed in more detail below, but generally, this hardware component distributes the configuration information contained in the device image 105 to the various regions of the IC 110 in the form of config packets 125.

To distribute the config packets 125, the IC 110 includes a hardware network 120. In one embodiment, the network 120 is a NoC, but is not limited to such. For example, the IC 110 may have dedicated configuration traces that are used to distribute the config packets 125 to the different regions in the IC 110. The type of hardware network being used can impact how the stream data is transferred at the physical level from the central configuration manager (e.g., the stream engine 115) to the distributed CIM circuits 130.

In FIG. 1 the IC 110 is subdivided into different regions (e.g., Region A and Region B). While two regions are shown, the IC 110 can be divided into any number of regions. One advantage of the distributed configuration system is that it can easily scale with the size of the configurable device 100. That is, as the size of the IC 110 increases, additional regions can be added.

Each region in the IC 110 includes a dedicated CIM circuit 130 for distributing configuration information to subsystems in that region. That is, the stream engine 115 can receive the device image 105 and distribute the packetized configuration information so that data used to configure the subsystems in Region A is transmitted to CIM circuit 130A while data used to configure the subsystems in Region B is transmitted to CIM circuit 130B.

Although not shown here, the CIM circuits 130 can have respective interfaces or ports to the subsystems in their respective regions. For example, the CIM circuit 130A can parse the received config packets 125A and transmit configuration information to different circuitry in the region. In this case, Region A include first circuit 135A and second circuit 135B. These circuits may be different (i.e., heterogeneous) circuitry. For example, the first circuit 135A may be memory controller and the second circuit 135B may be a hardened data processing engine. These circuits may use different types of interfaces to communicate with the CIM circuit 130A and use different types of configuration data. Rather than the central configuration manager (e.g., the stream engine 115) having to parse and distribute the configuration information to all the subsystems in the IC, in this example, the stream circuit 115 can forward the configuration information to each region and then it is up to the CIM circuit 130 to distribute the configuration information to the circuitry in that region using the different interfaces. However, in another embodiment, the first and second circuits 135A and 135B may be homogeneous circuitry (e.g., both may be memory controllers, or both are programmable logic blocks). Thus, the embodiments herein can be used if the regions have heterogeneous or homogenous circuitry.

Moreover, because the stream circuit 115 distributes the configuration information to different regions having dedicated CIM circuitry 130, the CIM circuitry 130 in each region can operate in parallel. That is, while the CIM circuitry 130A distributes configuration information to the first and second circuits 135A and 135B, the CIM circuitry 130B can distribute configuration information to third and fourth circuits 135C and 135D. In this manner, the regions in the IC 110 can be configured in parallel by dedicated CIM circuits 130.

Figure 2A:
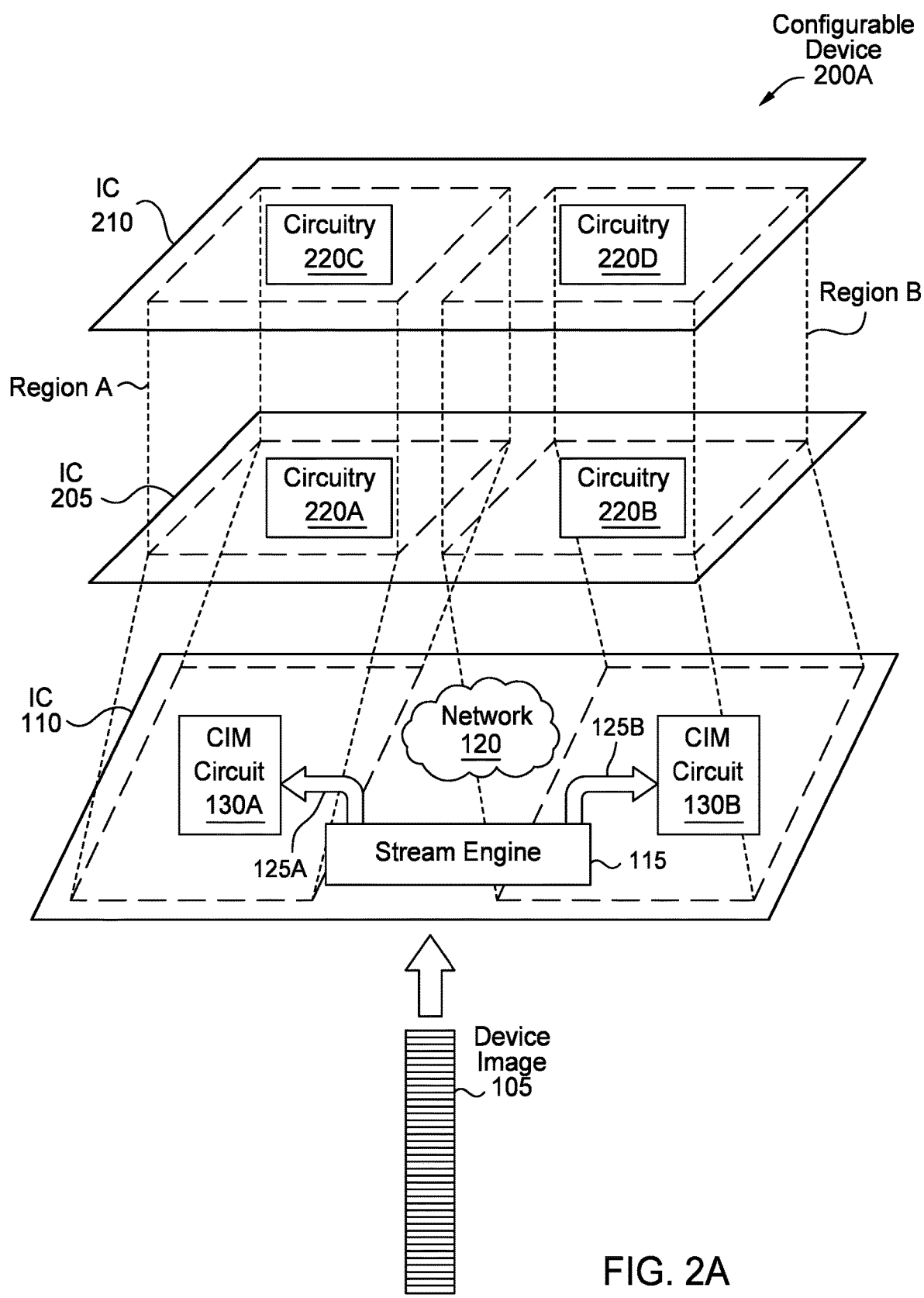
FIGS. 2A and 2B illustrate configuring multiple integrated circuits using a distributed configuration system, according to an embodiment.
Figure 2B:
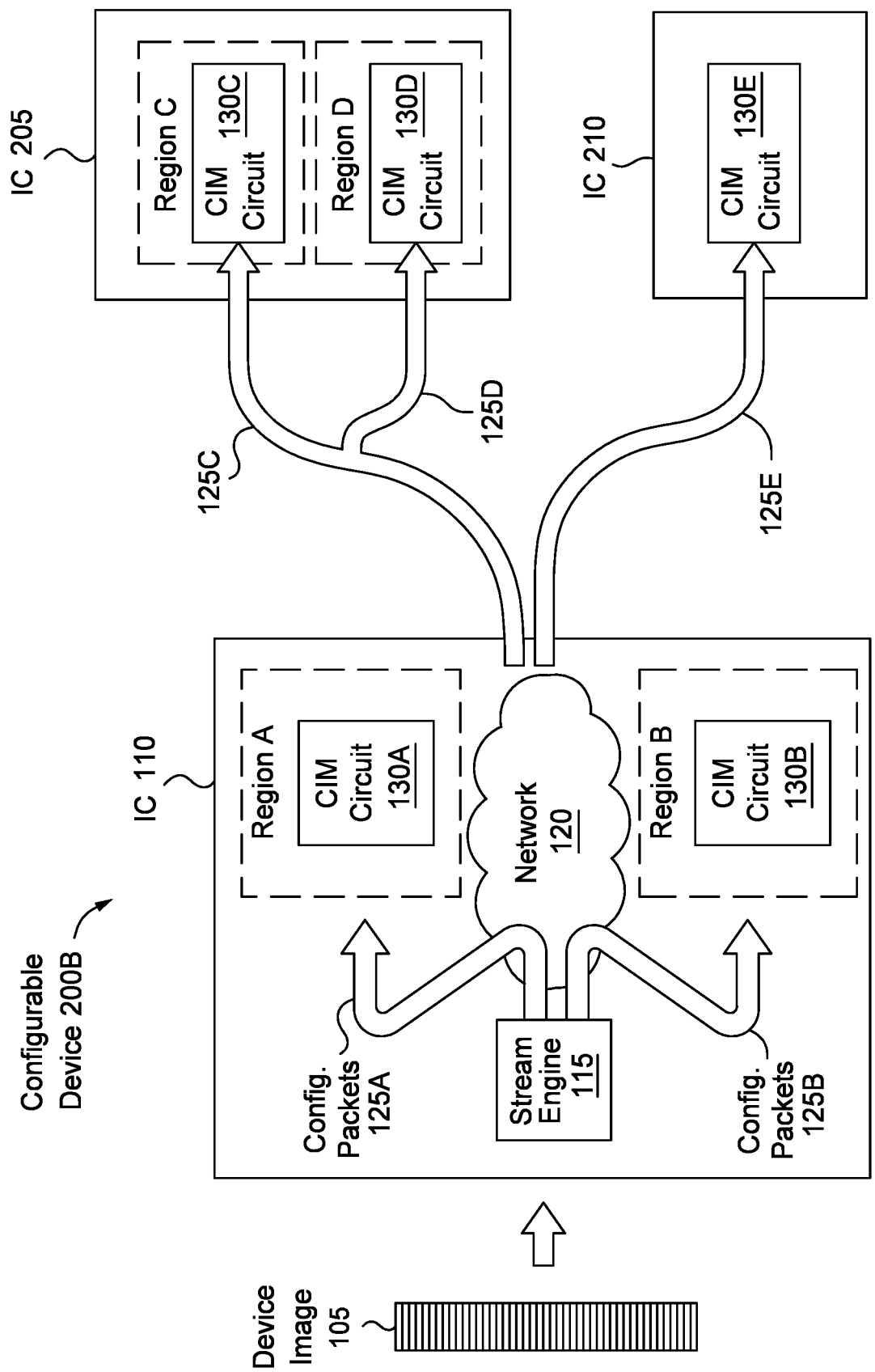

FIGS. 2A and 2B illustrates configuring multiple integrated circuits in a configurable device 200 using a distributed system, according to an embodiment. Unlike the distributed device 100 in FIG. 1, the configurable devices 200 in FIGS. 2A and 2B included multiple ICs—i.e., IC 110, IC 205, and IC 210, These ICs may be disposed in the same package. While three ICs are shown, the configurable device 200 can include any number of ICs.

In FIG. 2A, the configurable device 200A, the ICs are arranged in a 3D stack. For example, the IC 110 may be a base die while the ICs 205 and 210 are stacked on top of the base die. For instance, the base die may include peripherals and communication interface for communicating with an external host while the ICs 205 and 210 include different types of circuitry 220 (e.g., programmable logic or an array of data processing engines). The ICs may use through vias in order to transmit data to each other.

The IC 110 in FIG. 2A can be the same IC 110 as shown in FIG. 1 that includes multiple regions, each containing a dedicated OM circuit 130. Rather than being assigned 2D regions in the same IC as shown in FIG. 1, in FIG. 2A the CIM circuits are assigned 3D regions that span across the three ICs. That is, the CIM circuit 130A is assigned Region A which can include circuitry in IC 110 (not shown), circuitry 220A in IC 205, and circuitry 220C in IC 210. The CM circuit 130B is assigned Region B which can include circuitry in IC 110 (not shown), circuitry 220B in IC 205, and circuitry 220D in IC 210.

The circuitry 220 in each of the ICs 205 and 210 can be the same or different. In one example, the circuitry 220A and 220B in the IC 205 may be the same (e.g., programmable logic) while the circuitry 220C and 220C in the IC 210 is the same (e.g., data processing engines). Further, the circuitry 220A-D in both of the ICs 205 and 210 may be the same—e.g., all data processing engines.

While FIG. 2A illustrates stacking the ICs, in another embodiment, the ICs may be disposed on an interposer (i.e., side-by-side) where the interposer provides communication channels for transmitting data between the ICs. For example, the IC 110 may be an anchor die while the ICs 205 and 210 are chiplets. In this example, the ICs 205 and 210 may be disposed at different sides of the IC 110. The anchor die can include common blocks such as processor subsystem (PS), memory subsystem (DDR controllers), etc. The chiplets can include dedicated logic such as data processing engines, high-speed transceivers, or high bandwidth memory. In that case, the regions would not be 3D regions, but nonetheless each CIM circuit 130 can be assigned a region that includes portions from each of the three ICs in FIG. 2A.

In summary, FIG. 2A illustrates using CIM circuits 130 in one IC to configure circuitry 220 in different ICs. Thus, the ICs 205 and 210 do not have their own CIM circuitry.

Similar to FIG. 2A, FIG. 28 illustrates a configurable device 200B that has multiple ICs, but unlike FIG. 2A each IC has at least one CIM circuit 130. Moreover, unlike in FIG. 2A where the regions extend across the ICs, in FIG. 28 the regions may be confined in one IC.

Notably, the three ICs in FIG. 2B can be arranged either as a 3D stack as shown in FIG. 2A or side-by-side on an interposer.

The network 120 in the IC 110 can be used to forward config packets to the other ICs 205 and 210. That is, in addition to identifying config packets for the regions on the IC 110, the stream engine 115 also distributes config packets for the regions in the ICs 205 and 210. Because the IC 205 includes two regions (Regions C and D) that have dedicated CIM circuits 130C and 130D, the stream engine 115 transmits config packets 125C to the CIM circuit 130C for configuring the circuitry (not shown) in Region C and different config packets 125D to the CIM circuit 130D for configuring the circuitry (not shown) in Region D.

However, the IC 210 is not divided into multiple regions (although it could be). In this case, the stream engine 115 transmits to the CIM circuit 130E config packets 125E for configuring the circuitry in the IC 210. For example, the IC 210 may be smaller or have less configurable circuitry than the IC 205, and as such, the IC 210 is not divided into regions.

Thus, FIG. 2B illustrates a configurable device 200B that includes multiple ICs where a central configuration manager (e.g., the stream engine 11) on one of the ICs can distribute config packets 125 to CIM circuits 130 on different ICs. These ICs can each have more than one CIM circuit 130, depending on how many regions are in the ICs.

Figure 3:
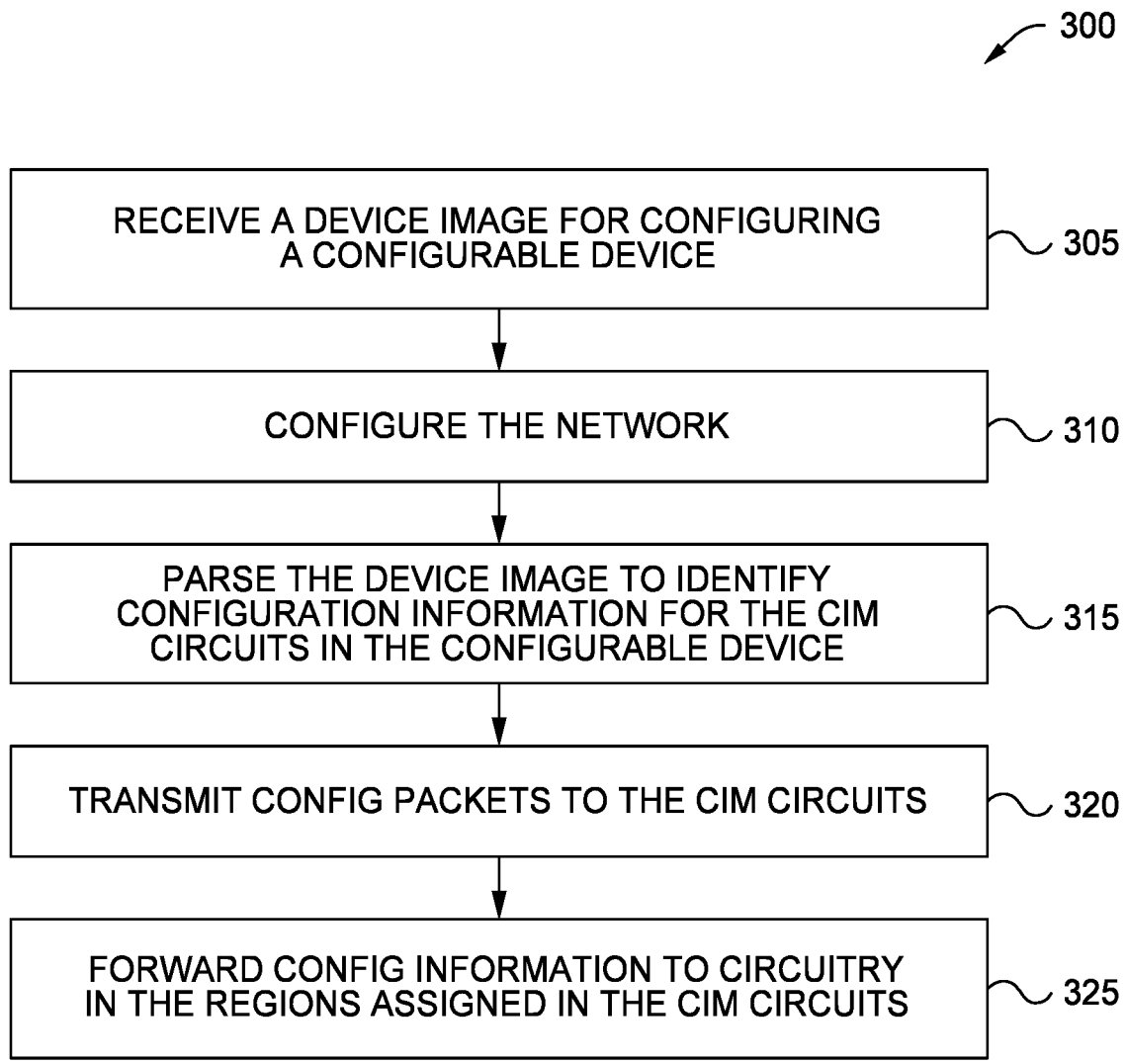
FIG. 3 is a flowchart for configuring a device using a distributed system, according to an embodiment.

FIG. 3 is a flowchart of a method 300 for configuring a device using a distributed system, according to an embodiment. At block 305, the stream engine (e.g., a central configuration manager) receives a device image for configuring a configurable device. The device image can be received as streaming data or memory-mapped data.

The configurable device can include only one IC that includes multiple CIM circuits as shown in FIG. 1, or the configurable device can include multiple ICs as shown in FIGS. 2A and 28. Regardless, in one embodiment, there is only one stream engine (i.e., only one central configuration manager) in the configurable device.

At block 310, the stream circuit configures a network in the configurable device. In one embodiment, the network is disposed on the same IC that includes the stream circuit. The stream circuit may be configured first in order for the stream circuit to distribute configuration information to the CIM circuits in the configurable device. For example, if the stream circuit uses a NoC to communicate with the CIM circuits, the device image may include data for configuring the NoC so it can communicate with the CIM circuits.

In one embodiment, the stream circuit includes its own CIM circuit for configuring the network. That is, the stream circuit may identify configuration information in the received device image that is intended to configure the network and forward this information to its CIM circuit, which in turn configures the network. The network can be configured to transmit data to CIM circuits on the same IC as well to CIM circuits on other ICs (if the configurable device has multiple ICs that have their own CIM circuits).

At block 315, the stream circuit parses the device image to identify configuration information (e.g., configuration packets) for the CIM circuits in the configurable device. In one embodiment, the device image can include embedded headers indicating what data is intended for which region. That is, the software tool in the host that generates and sends the device image to the configurable device can be aware of the regions in the configurable device. Thus, when generating the device image, the software application can organize the device image so that configuration information for circuitry in a particular region of the device is organized as packet data. Thus, when parsing the device image, the stream circuit can easily identify different portions of the device image destined to different regions (e.g., different CIM circuits) which can be arranged as packets of data. This is discussed in more detail in FIG. 5 below.

In one embodiment, the packetization of the configuration information in the device image can be performed by the stream circuit based on a dynamic scheduling algorithm of relocatable configuration contexts.

At block 320, the stream circuit transmits the config packets to the CIM circuits. That is, after identifying the data in the device image intended for the destination regions, the stream circuit can forward the corresponding config packets to the dedicated CIM circuits in those regions. Thus, each region receives only the configuration information used to configure circuitry in that region.

In one embodiment, the configurable device includes at least two CIM circuits. These CIM circuits may be on the same IC or multiple ICs. Further, a region can include an entire IC, a 2D region that includes only a sub-portion of an IC, or a 3D region that spans across multiple ICs. FIG. 2B illustrates an example where a region can include an entire IC (e.g., IC 210), while FIG. 1 illustrates 2D regions that cover sub-portions of an IC (e.g., IC 110) and FIG. 2A illustrates 3D regions that extend across multiple ICs.

In one embodiment, the communication between the stream circuit and the plurality of CIM circuits is encrypted so that each of the plurality of CIM circuits decrypts the portions (e.g., the configuration packets) received from the central configuration manager circuit. Further, in one embodiment, each of the plurality of CIM circuits is configured to perform an integrity check on the portions (packets) received from the stream circuit.

At block 325, the CIM circuits forward config information to circuitry in the regions assigned to the CIM circuits. That is, the CIM circuits parse the received packets, which can have configuration information for multiple subsystems in the region and identify which configuration information should be sent to which subsystem. The CIM circuits can use different interfaces or ports to the different subsystems in the region if those subsystems are heterogeneous systems.

Advantageously, in the method 300, the stream circuit mainly has the responsibility of streaming the configuration information to the various CIM circuits, as specified by the device image. The actual processing and forwarding of the configuration data to the specific circuits being configured is delegated to the CIMs.

In one embodiment, the CIM circuits operate in two modes. When in a first mode, a direct memory access (DMA) circuit in the stream circuit distributes the configuration information for a region as a continuous stream to the CIM circuit that is responsible for that region. When a configuration packet for a region is buffered in the CIM circuit, the CIM circuit can process the packet while the stream circuit sends configuration packets to the CIM circuits in the configurable device.

When in a second mode, the stream circuit copies the configuration packets for every region in a contiguous partition to DRAM a priori and instructs the CIM circuits to pull the packets from their regions in DRAM, concurrently. A contiguous partition is a partition where all the data in that partition is intended to be processed by a single CIM. Local storage in the CIM circuit is used to store the packets that are fetched by the CIM circuit from DRAM for hashing and authentication before use.

Figure 4:
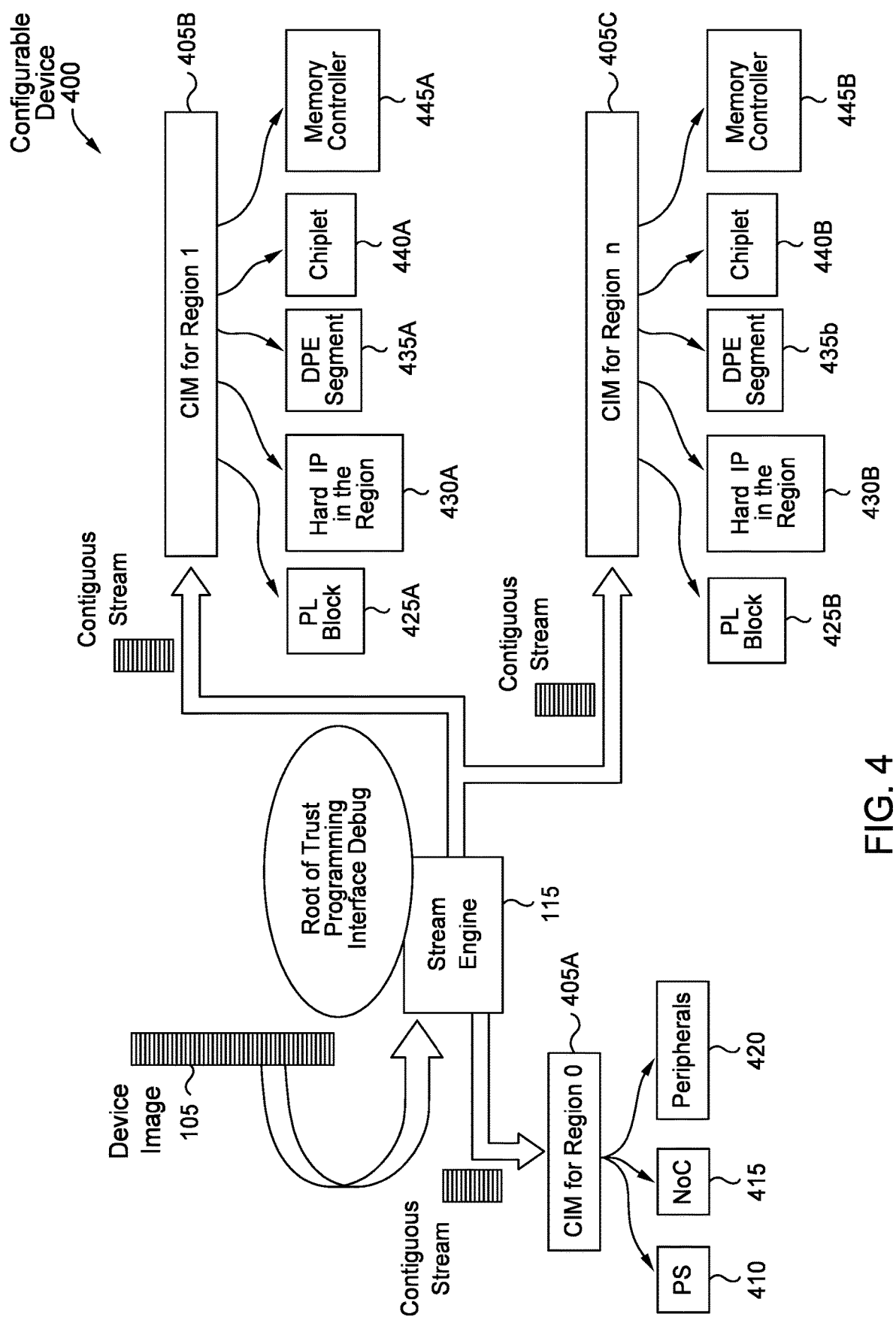
FIG. 4 illustrates configuring a device using a distributed system, according to an embodiment.

FIG. 4 illustrates configuring a configurable device 400 using a distributed system, according to an embodiment. As shown, the configurable device 400 receives a device image 105 at the stream circuit 115. In addition to distributing the configuration information in the device image 105 to the different regions as discussed above, the stream circuit 115 (e.g., a central configuration manager) can perform other functions. First, the stream circuit 115 can create an abstraction level which stays consistent across devices. That is, the stream circuit 115 can maintain consistent protocols for all the functions performed by the stream circuit 115 independent of the size of the device 400 and mix of features in the device 400. Second, the stream circuit 115 can act as a Root-of-Trust for the device 400. In one embodiment, the stream circuit 115 authenticates the device image 105 before it is distributed to the CIM circuits. Third, the stream circuit 115 can include debug interface logic as well as a debug packet controller for identifying errors that may occur during the configuration process.

In one embodiment, the stream circuit 115 is implemented in a processor, which can be a general-purpose processor. However, in other embodiments, the stream circuit 115 may be specialized circuitry for performing the functions described herein.

The device 400 includes N number of regions which correspond to N number of CIMs 405. In this case, it is assumed that Region 0 is disposed on the same IC as the stream circuit 115. This region includes the CIM circuit 405A, a PS 410, NoC 415, and peripherals 420.

The PS 410 may be a general-purpose processor that includes any number of cores. The PS 410 can be one or more processing subsystems that are also configured by a corresponding CIM—i.e., CIM circuit 405A.

Although not shown, the NoC 415 may extend throughout the device 400 to permit the various components in the device 400 to communicate with each other. For example, in one physical implementation, the stream circuit 115 may be disposed in an upper right portion of an IC in the configurable device 400 while the CIMs 405B and 405C are disposed in the upper left and lower left portions of the IC (or on another IC). However, using the NoC 415, the stream circuit 115 can nonetheless communicate with the CIM circuits 405B and 405C in those regions. However, in embodiment, the stream circuit 115 may first be required to configure the NoC 415 before it can transmit the configuration information to the CIM circuit 405B and 405C, which was discussed above at block 310 of the method 300.

The peripherals 420 can include I/O circuitry for communicating with external computing systems or devices. For example, the peripherals 420 may include a DMA engine for retrieving memory from the host computing system.

Although shown as being separate, in one embodiment, the UM circuit 405A is part of the stream circuit 115. Customizing firmware in the stream circuit 115 (e.g., the central configuration manager) for configuring each subsystem adds complexity and prevents optimization, resulting in larger code size, inefficient execution, and difficulty in validation. Since the processing of the regions is instead performed by the CIMs, and the stream circuit just streams the packets to the CIMs, a common piece of firmware can be used to push a configuration image to every region on the device. These regions can include different IPs and functionalities. Further, by including a CIM circuit in the stream circuit, the same programming model can be adopted for the regions that are directly communicating or integrated with the stream circuit on the same IC. Examples of configuration that is done by the local CIM circuit 405A in the stream circuit 115 is the configuration of the PS 410, NoC 415, and peripherals 420.

In this embodiment, Region 1 and Region n can include similar circuit elements, although this is not a requirement. That is, both regions include programmable logic (PL) blocks 425, hard IP 430, an interface to a chiplet 440 (when using the arrangement shown in FIG. 2A), and a memory controller 445. Alternatively, Region 1 may include only programmable logic while Region n includes only DPE segments.

The CIM circuits 405B and 405C can include separate interfaces or ports to the different circuit elements in Region 1 and Region n. Region 1 and Region n may be in the same IC as the Region 0, or may be in separate ICs. For example, Region 0 may be disposed in a first IC while Regions 1 through n are disposed in a second IC, or Region 0 may be disposed in a first IC while Region 1 is disposed in a second IC and Region n is disposed in a third IC.

The PL blocks 425 in Region 1 and Region n can include any amount of programmable logic. Using the configuration information in the device image 105, the CIM circuits 405B and 405C can configure the PL blocks 425 to perform a user-defined function during operation.

The hard IP 430 can include any variety of hardened circuitry that is can be configured using the device image 105.

The data processing engine (DPE) segments 435 can include a plurality of DPEs which may be arranged in a grid, cluster, or checkerboard pattern in the device 400. Further, each segment 435 can be any size and have any number of rows and columns formed by the DPEs. In one embodiment, the DPEs in the segments 435 are identical. That is, each of the DPEs (also referred to as tiles or blocks) may have the same hardware components or circuitry. Further, the embodiments herein are not limited to DPEs. Instead, the device 400 can include an array of any kind of processing elements, for example, the DPEs could be digital signal processing engines, cryptographic engines, Forward Error Correction (FEC) engines, or other specialized hardware for performing one or more specialized tasks.

The chiplets 440 can be part of an anchor/chiplet arrangement as discussed above in FIG. 2A. For example, the CIM circuit 405B may be tasked with forwarding configuration information to the chiplet 440A while the CHM circuit 405C is tasked with forwarding configuration information to the chiplet 440B.

Having the stream circuit 115 (e.g., the central configuration manager) involved in low-level data movement at the device level for configuration is inefficient in terms of performance and power. Thus, as discussed above, the stream circuit 115 streams configuration information through the network (e.g., the NoC 415) to the CIM circuits 405 that are distributed across the device. By directly streaming the configuration information to the CIM circuits 405 using hardware, the stream circuit 115 does not create a bottleneck. Also, the config packets (which make up the contiguous streams shown in FIG. 4) are transferred from the stream circuit to the CIM circuits 405 with maximal burst capabilities avoiding overloading the NoC 415 with many small independent memory transfers.

Figure 5:
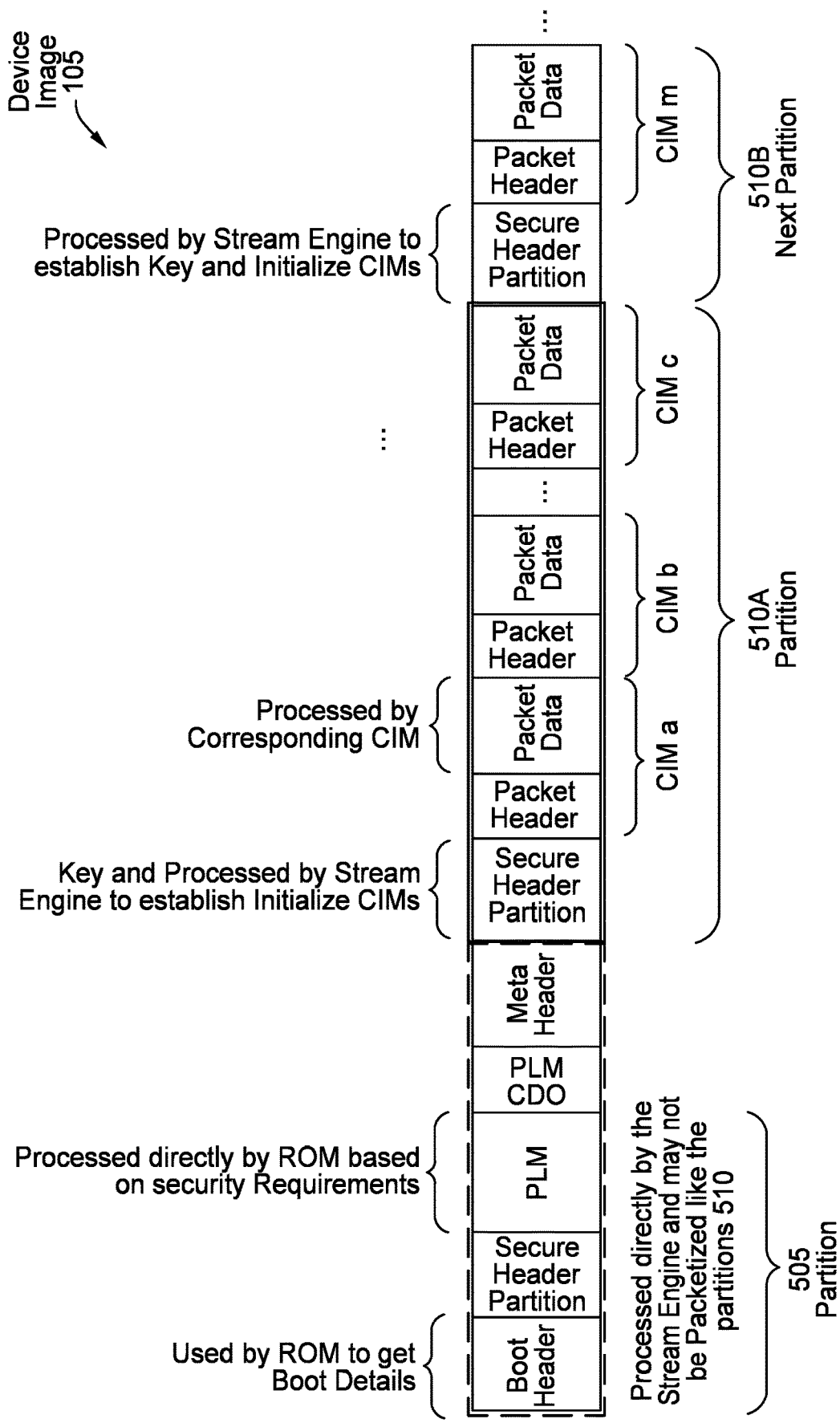
FIG. 5 illustrates a portion of a device image, according to an embodiment.

FIG. 5 illustrates a portion of the device image 105, according to an embodiment. FIG. 5 illustrates the high-level organization that can be used in the device image 105 for a configurable device. The image 105 includes a boot header and multiple programming partitions, where each partition is destined for a particular region in the configurable device. The boot header provides information used to authenticate the access to the device and to process the rest of the image 105, including its authentication and decryption.

The partition 505 in the device image 105 is the main partition that may always be present and includes the Platform Loader and Manager (PLM) firmware that executes on, for example the processor that also includes the stream circuit or the central configuration manager. In one embodiment, the main partition 505 is loaded by a read only memory (ROM) in the processor while the loading of the other partitions is done by the PLM firmware in conjunction with the CIM circuits.

In this example, each subsequent partition 510 includes a secure partition header that is processed by the stream circuit to establish keys and other configuration information used by the CIM circuits to process the partition. The remaining part of the partitions 510 is divided into multiple packets which the stream circuit routes to a specific CIM circuit (e.g., CIM a, CIM b, CIM c, etc.) for processing. The packet headers for the packets in the partitions 510 identify the target CIM circuit so the stream circuit knows the destination for each of the packets. In this manner, the stream circuit is able to packetize the data as discussed at block 315 in the method 300 and forward the packets to the specific CIM circuits.

Further, the packet data in each of the packets in the partitions 510 is then processed at the CIM circuits and not at the stream circuit. Thus, processing the configuration information in the data packets (and forwarding that configuration information to the specific circuit being configured) is delegated to the CIM circuits once the packets are received by those circuits.

Figure 6:
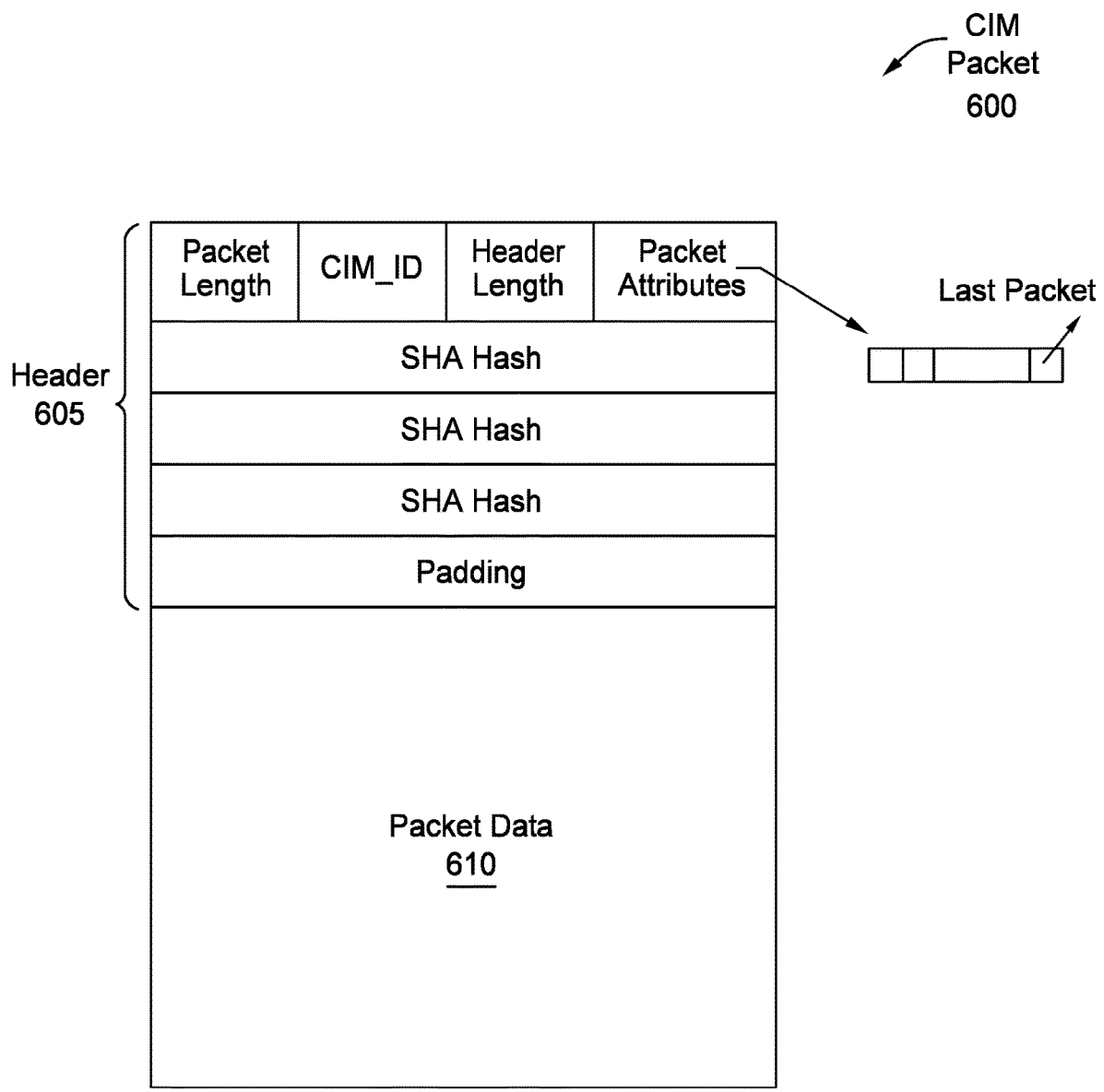
FIG. 6 illustrates a packet in a device image, according to an embodiment.

FIG. 6 illustrates a CIM packet 600 in a device image, according to an embodiment. That is, FIG. 6 illustrates an example format of the packets in the partitions 510 in FIG. 5. The packet 600 is divided into a header 605 and a packet data 610 (i.e., a payload). The first quad-word in the packet 600 specifies the target CIM (using a CIM ID), packet length, header length, and packet attributes.

In one embodiment, the length of the packet 600 and the header 605 are always multiples of quad-words. Further, the least significant bit of the packet attribute can indicate whether the packet is the last packet in the partition that needs to be transferred using, e.g., direct memory access (DMA).

The packet header 605 also includes a SHA hash (e.g., or any other suitable cryptography element) for the next packet. The padding in the header 605 can be used to ensure the packet length satisfies the requirement for the SHA-3 architecture. The last packet in one of the partitions 510 in FIG. 5 may not include the SHA hash and padding since there is not a next packet in that partition 510.

In one embodiment, the CIM packets 600 is hashed in its entirety, which includes the header 605 and the payload—i.e., the packet data 610. In one embodiment, each CIM circuit includes sufficient internal storage to buffer at least two packets. Buffering the packets 600 in the CIM circuits allows the packets 600 to also be validated to ensure data integrity, as well as to be decrypted to ensure data privacy.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A configurable device, comprising:
    a central configuration manager circuit; and
    a plurality of configuration interface manager (CIM) circuits connected to the central configuration manager circuit and distributed throughout the configurable device,
    wherein the central configuration manager circuit is configured to:
        receive a device image for configuring the configurable device;
        parse the device image to identify respective configuration packets to be transmitted to the plurality of CIM circuits using different headers; and
        transmit the configuration packets to the plurality of CIM circuits,
    wherein the plurality of CIM circuits is configured to forward the configuration packets to assigned regions of the configurable device.

2. The configurable device of claim 1, wherein the device image is received at least one of (i) as streaming data at the central configuration manager circuit or (ii) through memory-mapped data writes at the central configuration manager circuit.

3. The configurable device of claim 2, wherein the streaming data or the memory-mapped data includes embedded headers indicating what configuration data in the streaming data or the memory-mapped data is intended for which of the assigned regions.

4. The configurable device of claim 3, wherein each of the plurality of CIM circuits is assigned to only one region, wherein each of the plurality of CIM circuits only receives configuration data that is intended for its assigned region, wherein each of the configuration packets is transmitted to only one of the assigned regions.

5. The configurable device of claim 1, further comprising only one integrated circuit, wherein the assigned regions divide up sub-systems in the integrated circuit.

6. The configurable device of claim 1, further comprising a plurality of integrated circuits, wherein at least one of the assigned regions spans across the plurality of integrated circuits.

7. The configurable device of claim 6, wherein at least two of the assigned regions span across the plurality of integrated circuits.

8. The configurable device of claim 1, wherein the central configuration manager circuit is configured to, before transmitting the configuration packets to the plurality of CIM circuits, use configuration information in the device image to configure a network in the configurable device, wherein the network communicatively couples the plurality of CIM circuits to the central configuration manager.

9. The configurable device of claim 8, wherein the central configuration manager circuit includes one of the plurality of CIM circuits that configures the network using the configuration information.

10. A method comprising:
   receiving, at a central configuration manager circuit, a device image for configuring a configurable device;
   parsing the device image to identify respective configuration packets fefto be transmitted to a plurality of CIM circuits in the configurable device using different headers;
   transmitting the configuration packets from the central configuration manager circuit to the plurality of CIM circuits; and
   forwarding, by the plurality of CIM circuits, the configuration packets to assigned regions of the configurable device.

11. The method of claim 10, wherein the device image is received at least one of (i) as streaming data at the central configuration manager circuit or (ii) through memory-mapped data writes at the central configuration manager circuit.

12. The method of claim 11, wherein the streaming data or the memory-mapped data includes embedded headers indicating what configuration data in the streaming data or the memory-mapped data is intended for which of the assigned regions.

13. The method of claim 12, wherein each of the plurality of CIM circuits is assigned to only one region, wherein each of the plurality of CIM circuits only receives configuration data that is intended for its assigned region, wherein each of the configuration packets is transmitted to only one of the assigned regions.

14. The method of claim 10, wherein the configurable device includes only one integrated circuit, wherein the assigned regions divide up sub-systems in the integrated circuit.

15. The method of claim 10, wherein the configurable device includes a plurality of integrated circuits, wherein at least one of the assigned regions spans across the plurality of integrated circuits.

16. The method of claim 10, further comprising:
   before transmitting the configuration packets to the plurality of CIMs circuit, using configuration information in the device image to configure a network in the configurable device, wherein the network communicatively couples the plurality of CIM circuits to the central configuration manager.

17. The method of claim 16, wherein the central configuration manager circuit includes one of the plurality of CIM circuits that configures the network using the configuration information.

18. A configurable device, comprising:
   a central configuration manager circuit;
   a network; and
   a plurality of configuration interface manager (CIM) circuits connected to the central configuration manager circuit via the network,
   wherein the central configuration manager circuit is configured to:
      receive a device image for configuring the configurable device; and
      transmit respective portions of the device image to the plurality of CIM circuits using different headers,
   wherein the plurality of CIM circuits is configured to forward the portions of the device image to assigned regions of the configurable device.

19. The configurable device of claim 18, wherein the device image includes embedded headers indicating what portions of the device image are intended for which of the assigned regions.

20. The configurable device of claim 18, wherein communication between the central configuration manager circuit and the plurality of CIM circuits is encrypted wherein each of the plurality of CIM circuits decrypts the portions received from the central configuration manager circuit, and
   wherein each of the plurality of CIM circuits is configured to perform an integrity check on the portions received from the central configuration manager circuit.

* * * * *